US012327531B2

(12) United States Patent
Lee

(10) Patent No.: US 12,327,531 B2
(45) Date of Patent: Jun. 10, 2025

(54) ELECTRONIC APPARATUS AND CONTROL METHOD THEREOF

(71) Applicant: SAMSUNG ELECTRONICS CO., LTD., Suwon-si (KR)

(72) Inventor: Minhoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/160,679

(22) Filed: Jan. 27, 2023

(65) Prior Publication Data

US 2023/0197023 A1 Jun. 22, 2023

Related U.S. Application Data

(63) Continuation of application No. 17/536,805, filed on Nov. 29, 2021, now Pat. No. 11,587,517, which is a (Continued)

(30) Foreign Application Priority Data

Oct. 8, 2020 (KR) ........................ 10-2020-0130130
Mar. 17, 2021 (KR) ........................ 10-2021-0034414

(51) Int. Cl.
*G09G 3/34* (2006.01)

(52) U.S. Cl.
CPC ... *G09G 3/3426* (2013.01); *G09G 2310/0237* (2013.01); *G09G 2330/021* (2013.01)

(58) Field of Classification Search
None
See application file for complete search history.

(56) References Cited

U.S. PATENT DOCUMENTS 5,731,802 A 3/1998 Aras et al.
7,119,773 B2 10/2006 Kim
(Continued)

FOREIGN PATENT DOCUMENTS

CN 111477164 A 7/2020
JP 2008-309935 A 12/2008
(Continued)

OTHER PUBLICATIONS

Communication dated Jan. 21, 2022, issued by the International Searching Authority in counterpart International Application No. PCT/KR2021/013683 (PCT/ISA/210 and PCT/ISA/237).
(Continued)

*Primary Examiner* — Matthew Yeung
(74) *Attorney, Agent, or Firm* — Sughrue Mion, PLLC

(57) ABSTRACT

An electronic apparatus is provided, which includes a memory storing an input image, a backlight unit, a driver configured to output a driving current to the backlight unit, and a processor configured to identify a time interval at which current is applied among a plurality of time intervals based on a value of a plurality of first bits among a plurality of bits representing a gray level value of the input image, and control the driver to change a magnitude of a current of a time interval among the plurality of time intervals based on at least one second bit which is the rest of the plurality of bits excluding the plurality of first bits, and a number of the plurality of time intervals is determined based on the number of the plurality of first bits.

19 Claims, 14 Drawing Sheets

Related U.S. Application Data continuation of application No. PCT/KR2021/013683, filed on Oct. 6, 2021.

(56) References Cited

U.S. PATENT DOCUMENTS

| | | | | |
|---|---|---|---|---|
| 7,227,519 | B1 | 6/2007 | Kawase et al. | |
| 8,294,648 | B2 | 10/2012 | Kwon | |
| 8,624,940 | B2 | 1/2014 | Kim et al. | |
| 8,902,148 | B2 | 12/2014 | Lee et al. | |
| 9,368,060 | B2 | 6/2016 | Chae et al. | |
| 9,437,127 | B2 | 9/2016 | Park et al. | |
| 10,706,766 | B2 | 7/2020 | Kim et al. | |
| 10,971,057 | B2 | 4/2021 | Jung et al. | |
| 11,132,959 | B2 | 9/2021 | Lee | |
| 2001/0019319 | A1 | 9/2001 | Kim | |
| 2002/0195966 | A1* | 12/2002 | Aoki | G09G 3/2011 315/169.3 |
| 2003/0063108 | A1* | 4/2003 | Isono | G09G 3/2011 345/690 |
| 2004/0239668 | A1 | 12/2004 | Morosawa et al. | |
| 2004/0239696 | A1* | 12/2004 | Okabe | G09G 3/3283 345/690 |
| 2006/0139276 | A1 | 6/2006 | Choi et al. | |
| 2006/0139286 | A1 | 6/2006 | Kida et al. | |
| 2006/0187156 | A1 | 8/2006 | Kasai | |
| 2007/0013628 | A1 | 1/2007 | Kim et al. | |
| 2008/0150864 | A1 | 6/2008 | Bergquist | |
| 2013/0169697 | A1 | 7/2013 | Park et al. | |
| 2014/0240305 | A1 | 8/2014 | Chae et al. | |
| 2014/0340382 | A1* | 11/2014 | Sawabe | G09G 3/3614 345/212 |
| 2017/0061901 | A1* | 3/2017 | Zhang | G09G 3/3426 |
| 2017/0270845 | A1* | 9/2017 | Kuo | G09G 3/32 |
| 2019/0114973 | A1 | 4/2019 | Zha | |
| 2020/0105182 | A1 | 4/2020 | Koo et al. | |
| 2020/0118482 | A1 | 4/2020 | Jung et al. | |
| 2021/0020101 | A1* | 1/2021 | Van Eessen | G09G 3/006 |
| 2021/0020114 | A1 | 1/2021 | Lee | |
| 2022/0044643 | A1* | 2/2022 | Gu | G09G 3/32 |

FOREIGN PATENT DOCUMENTS

| | | | |
|---|---|---|---|
| KR | 1020010087003 | A | 9/2001 |
| KR | 10-2002-0025984 | A | 4/2002 |
| KR | 10-2005-0102573 | A | 10/2005 |
| KR | 1020060127356 | A | 12/2006 |
| KR | 1020070115467 | A | 12/2007 |
| KR | 10-2013-0076678 | A | 7/2013 |
| KR | 10-2014-0108604 | A | 9/2014 |
| KR | 10-1594855 | B1 | 2/2016 |
| KR | 10-2019-0085324 | A | 7/2019 |
| KR | 10-1994107 | B1 | 9/2019 |
| KR | 10-2020-0038735 | A | 4/2020 |
| KR | 10-2020-0042809 | A | 4/2020 |
| KR | 1020200088696 | A | 7/2020 |

OTHER PUBLICATIONS

Extended European Search Report dated Oct. 5, 2023, issued by European Patent Office in European Patent Application No. 21877984.1.

Communication dated Sep. 12, 2024, issued by the Korean Patent Office in Korean Application No. 10-2021-0034414.

* cited by examiner

ELECTRONIC APPARATUS AND CONTROL METHOD THEREOF

CROSS-REFERENCE TO RELATED APPLICATION(S)

This application is a Continuation of U.S. application Ser. No. 17/536,805, filed Nov. 29, 2021, which is a by-pass continuation application of International PCT Application No. PCT/KR2021/013683 filed Oct. 6, 2021, which is based on and claims priority under 35 U.S.C. § 119 (a) of a Korean patent application number 10-2021-0034414, filed on Mar. 17, 2021, and a Korean patent application number 10-2020-0130130, filed on Oct. 8, 2020, in the Korean Intellectual Property Office, the disclosure of which are incorporated by reference herein in their entirety.

BACKGROUND

1. Field

The disclosure relates to an electronic apparatus and a control method thereof and, more particularly, to an electronic apparatus driving a backlight unit and a control method thereof.

2. Description of Related Art

Recently, image quality a display device is improved according to the development of the electronic technology. According to a method for improving image quality, the number of light emitting elements included in a backlight unit is increased. As the number of light emitting elements increases, the number of pixels covered by one light emitting element is reduced, and accordingly, color to be represented by each pixel may be represented more accurately.

One of the methods of controlling the backlight unit includes individually driving each of the light emitting devices. However, there is a problem in that a resource for individual driving increases as the number of light emitting devices increases.

Another method of controlling the backlight unit includes using an active matrix (AM) scheme or a passive matrix (PM) scheme. The two schemes are the same in terms of sequentially controlling the plurality of light emitting elements through the gate control signal, but the AM scheme is different from the PM scheme in terms of further including a hold element, and charging a capacitor of the hold element while the gate control signal is applied to maintain light emission.

However, as for AM scheme and PM scheme, when the number of light emitting devices increases, there is a problem in that the time for driving one light emitting device is shortened. That is, a sufficient time for pulse width modulation (PWM) control may not be secured. As the number of bits representing the gray level value of the input image increases, there is a problem in that it is difficult to control the PWM.

Alternatively, the backlight unit may be controlled through pulse amplitude modulation (PAM) control, but recently, the light emitting device is implemented as a light emitting diode (LED), and wavelength of the LED varies according to currents. As shown in FIG. 1A, if the magnitude of the current is changed, the wavelength is changed, and the color coordinates are distorted as shown in FIG. 1B.

In this case, there may be a problem in that color spots are generated for each position or the basic integrity of the display is damaged.

Accordingly, there is a necessity to develop a method of driving a backlight unit while minimizing a change in wavelength.

SUMMARY

According to an aspect of the disclosure, there is provided an electronic apparatus including: a memory storing an image; a backlight unit; a driver configured to output a driving current to the backlight unit; and a processor configured to: identify a first time interval at which a first current is applied among a plurality of time intervals based on a value of a plurality of first bits, among a plurality of bits corresponding to a gray level value of the image, and control the driver to change a magnitude of a second current of a second time interval among the plurality of time intervals based on at least one second bit, among the plurality of bits, different from the plurality of first bits, wherein a number of the plurality of time intervals is based on a number of the plurality of first bits.

The processor may be further configured to identify the plurality of first bits based on an order of each of the plurality of bits.

The processor may be further configured to control the driver to apply the first current of a first magnitude during the first time interval, and apply the second current having a second magnitude equal to or below the first magnitude during the second time interval.

The second magnitude of the second current may be determined by raising two to the power of a number of the at least one second bit.

The processor may be further configured to control the driver to, based on the gray level value of the image being less than a threshold value, refrain from applying a current for remaining time intervals except the second time interval, among the plurality of time intervals, and to apply the second current of the second magnitude less than the first magnitude for the second time interval.

The processor may include a timing controller configured to output digital data corresponding to a gray level value of the image, and wherein the driver may include a driver integrated circuit (IC) configured to output the driving current in an analog format based on the digital data.

The driver may further include a pixel IC configured to amplify the driving current output from the driver IC and output the amplified driving current to the backlight unit.

The pixel IC may output the amplified driving current in a hold state.

The driver IC may include an interface drivable for a predetermined number or more per frame.

The number of the plurality of time intervals may be determined by raising two to the power of a number of the plurality of first bits.

According to another aspect of the disclosure, there is provided a control method of an electronic apparatus, the method including: identifying a first time interval at which a first current is applied among a plurality of time intervals based on a value of a plurality of first bits, among a plurality of bits corresponding to a gray level value of an image; changing a magnitude of a second current of a second time interval among the plurality of time intervals based on at least one second bit, among the plurality of bits, different from the plurality of first bits; and outputting a driving current to a backlight unit based on the first current and the second current, wherein a number of the plurality of time intervals is determined based on the number of the plurality of first bits.

The method may further include: identifying the plurality of first bits based on an order of each of the plurality of bits.

The outputting may include applying the first current of a first magnitude during the time interval, and applying the current having a second magnitude below or equal to the first magnitude during the second time interval.

The second magnitude of the second current may be determined by raising two to the power of a number of the at least one second bit for 2.

The outputting may include, based on the gray level value of the image being less than a threshold value, refrain from applying a current for remaining time intervals except the second time interval, among the plurality of time intervals, and to applying the second current of the second magnitude less than the first magnitude for the second time interval.

According to another aspect of the disclosure, there is provided an electronic apparatus including: a memory configured to store one or more instructions; and a processor configured to execute the one or more instructions to: perform a pulse width modulation (PWM), based on a plurality of first bits, among a plurality of bits corresponding to a gray level value of an image, to control a driver to output a driving current to a backlight unit; and perform a pulse amplitude modulation (PAM) based on one or more second bits, among the plurality of bits, the one or more second bits being different from the plurality of first bits.

The processor may be further configured to perform the PWM by identifying one or more first time intervals, among a plurality of time intervals, based on a first value of the plurality of first bits.

The processor may be further configured to perform the PAM by identifying a magnitude of a current to be applied to the backlight unit based on a second value of the one or more second bits.

According to another aspect of the disclosure, there is provided a method including: performing a pulse width modulation (PWM), based on a plurality of first bits, among a plurality of bits corresponding to a gray level value of an image, to control a driver to output a driving current to a backlight unit; and performing a pulse amplitude modulation (PAM) based on one or more second bits, among the plurality of bits, the one or more second bits being different from the plurality of first bits.

The performing the PWM may include identifying one or more first time intervals, among a plurality of time intervals, based on a first value of the plurality of first bits, and performing the PAM may include identifying a magnitude of a current to be applied to the backlight unit based on a second value of the one or more second bits.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
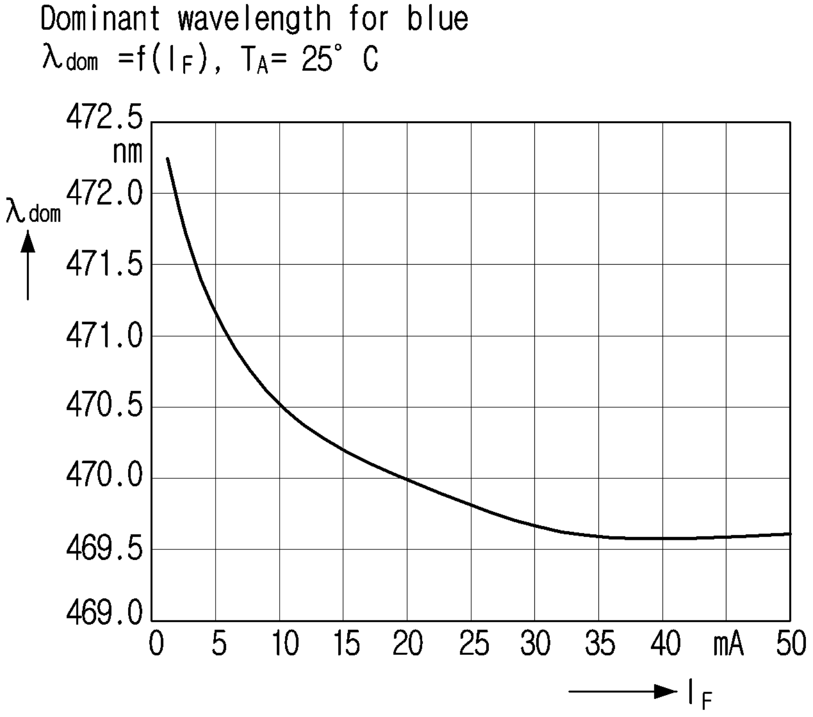
FIGS. 1A and 1B are diagrams illustrating variation in wavelengths of an LED based on currents according to related art method.
Figure 1B:
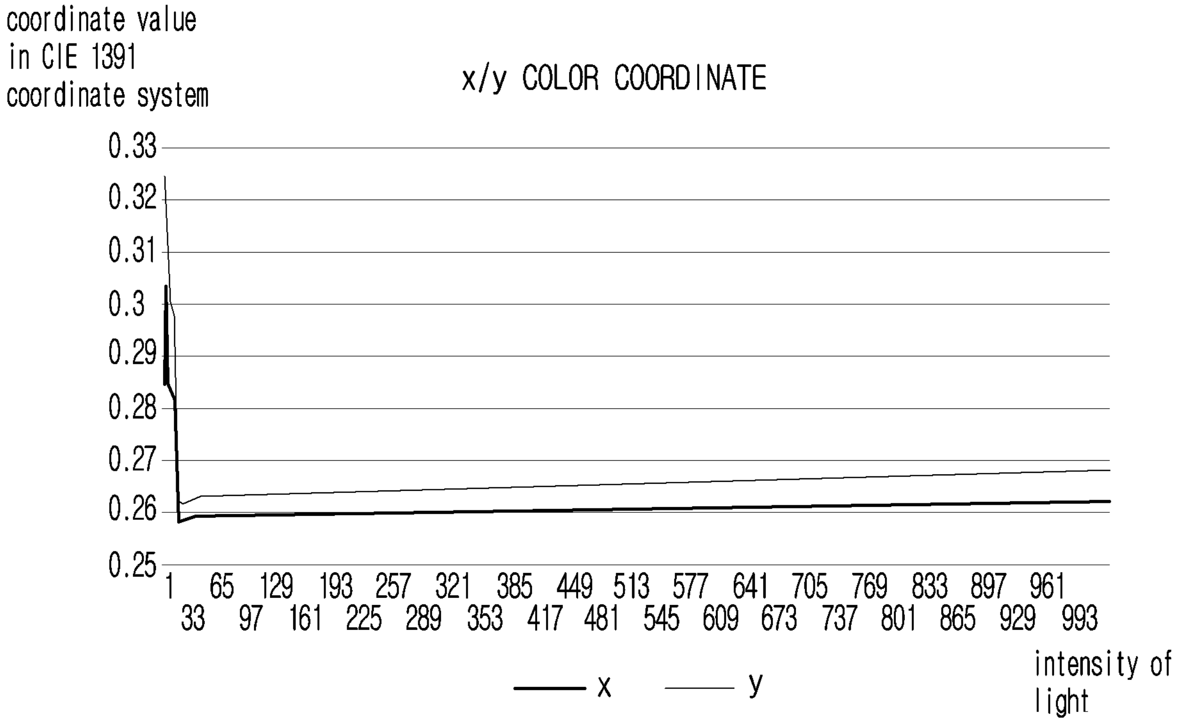

The exemplary embodiments of the disclosure may be diversely modified. Accordingly, specific exemplary embodiments are illustrated in the drawings and are described in detail in the detailed description. However, it is to be understood that the disclosure is not limited to a specific exemplary embodiment, but includes all modifications, equivalents, and substitutions without departing from the scope and spirit of the disclosure. Also, well-known functions or constructions are not described in detail since they would obscure the disclosure with unnecessary detail.

Hereinafter, this disclosure will be further described with reference to the accompanying drawings.

According to an aspect of the disclosure, an electronic apparatus is provided for efficiently driving a backlight unit while securing color uniformity and a control method thereof.

The terms used in the specification and the claims are general terms identified in consideration of the functions of the various example embodiments of the disclosure. However, these terms may vary depending on intention, technical interpretation, emergence of new technologies, and the like of those skilled in the related art. Some terms may be selected by an applicant arbitrarily, and the meaning thereof will be described in the detailed description. Unless there is a specific definition of a term, the term may be construed based on the overall contents and technological understanding of those skilled in the related art.

In this specification, the expressions "have," "may have," "include," or "may include" or the like represent presence of a corresponding feature (for example: components such as numbers, functions, operations, or parts) and does not exclude the presence of additional feature.

The expression "at least one of A or/an B" should be understood to represent "A" or "B" or any one of "A and B."

As used herein, the terms "first," "second," or the like may denote various components, regardless of order and/or importance, and may be used to distinguish one component from another, and does not limit the components.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

In this disclosure, a term user may refer to a person using an electronic apparatus or an apparatus (for example: artificial intelligence (AI) electronic apparatus) that uses an electronic apparatus.

Hereinafter, example embodiments of the disclosure will be described in detail with reference to the accompanying drawings.

Figure 2:
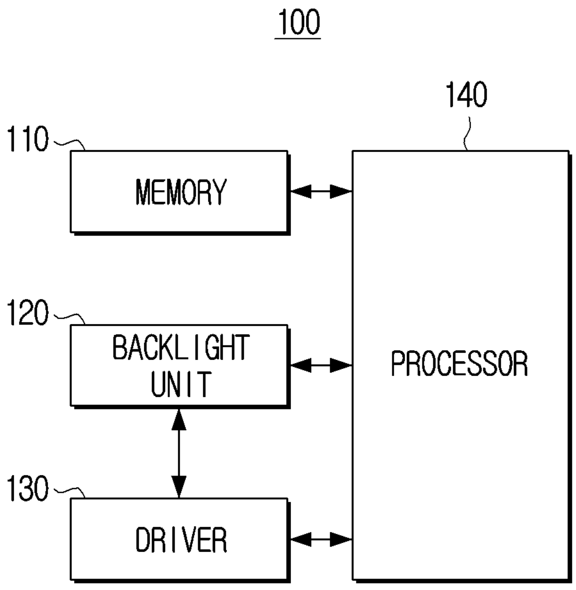
FIG. 2 is a block diagram of an electronic apparatus according to an example embodiment of the disclosure.

FIG. 2 is a block diagram of an electronic apparatus 100 according to an example embodiment of the disclosure.

The electronic apparatus 100 is an apparatus to control a backlight unit and may be an apparatus which includes a display panel, such as a TV, a desktop PC, a notebook PC, a video wall, a large format display (LFD), a digital signage, a digital information display (DID), a projector display, a digital video disk (DVD) player, a smartphone, a tablet PC, a monitor, smart glasses, a smart watch, etc. Furthermore, the apparatus may and directly display an obtained graphic image on the display panel.

The disclosure is not limited thereto, and as such, according to another example embodiment, the electronic apparatus 100 may be an apparatus detachably attached to a display panel, and any apparatus that may control the backlight unit may be used.

As illustrated in FIG. 2, the electronic apparatus 100 includes a memory 110, a backlight unit 120, a driver 130, and a processor 140.

The memory 110 may refer to a hardware that stores information such as data as an electric or magnetic form so that the processor 140, or the like, may access, and the memory 110 may be implemented as at least one hardware among a non-volatile memory, a volatile memory, a flash memory, a hard disk drive (HDD) or solid state drive (SSD), random access memory (RAM), read-only memory (ROM), or the like.

The memory 110 may store at least one instruction, program, or data used for operation of the electronic apparatus 100 or the processor 140. The instruction is a code unit that directs the operation of the electronic apparatus 100 or the processor 140, and may be written in a machine language that may be understood by a computer. A module may be an instruction set of a series of instructions that perform a particular task of a task unit.

The memory 110 may store data which is information in bit unit or byte unit that may represent characters, numbers, images, or the like. For example, the memory 110 may store information about an input image.

The memory 110 may be accessed by the processor 140, and read/write/modify/update, etc., for instructions, modules or data may be performed by the processor 140.

The backlight unit 120 generates light and provides the light to the display panel. The backlight unit 120 may include one or more light-emitting devices, and may be disposed on the rear surface of the display panel so that a display panel displays an image, and emits light to the display panel.

A light emitting device may emit light as a light source. The light emitting device may be implemented as a light emitting diode (LED), and may emit light by receiving a current output by the driver 130.

The driver 130 may output a driving current to the backlight unit 120 under the control of the processor 140. The driving current is in the form of combination of a pulse width modulation (PWM) type and a pulse amplitude modulation (PAM) type, and the operation of the processor 140 will be described in detail.

The processor 140 may control the operation of the electronic apparatus 100. Specifically, the processor 140 may be connected to each configuration of the electronic apparatus 100 to generally control the operation of the electronic apparatus 100. For example, the processor 140 may be connected to a configuration such as the memory 110, the backlight unit 120, and the driver 130 to control the operation of the electronic apparatus 100.

According to an example embodiment, the processor 140 according to an embodiment may be implemented as a digital signal processor (DSP), a microprocessor, a time controller (TCON). However, the disclosure is not limited thereto, and as such, according to another example embodiment, the processor may include, for example, and without limitation, one or more from among a central processing unit (CPU), a micro controller unit (MCU), a micro processing unit (MPU), a controller, an application processor (AP), a communication processor (CP), an ARM processor, or the like, or may be defined by the corresponding term. In addition, the processor 140 may be implemented as a System on Chip (SoC) or large scale integration (LSI) embedded with a processing algorithm, and may be implemented in the form of a field programmable gate array (FPGA).

The processor 140 may identify a time interval to which a current is to be applied, among a plurality of time intervals, based on a value of a plurality of first bits, among a plurality of bits representing a gray level value of the input image, and may control the driver 130 to change the magnitude of the current in one of the plurality of time intervals based on at least one second bit which is the rest of the plurality of bits excluding the plurality of first bits. The number of the plurality of time intervals may be determined based on the number of the plurality of first bits.

For example, when the gray level value of the input image is represented by 5 bits, the processor 140 may use 3 bits of 5 bits as the plurality of first bits. The processor 140 may identify a time interval to which a current is to be applied, among a plurality of time intervals based on a value of the first bit. Moreover, the processor 140 may identify the remaining 2 bits of the 5 bits as the second bits and control the driver 130 to change the magnitude of the current in one of the plurality of time intervals based on the remaining 2 bits. The number of the plurality of time intervals may be a multiplier of a plurality of first bits for 2. That is, the number of the plurality of time intervals may be calculated by raising 2 to the power of a number plurality of first bits. For example, the number of the plurality of time intervals may be 8 as 2 to the power of 3 is equal to 8. The processor 140 may identify a time interval in which a current flows based on a value of 3 bits during eight time intervals. However, the example embodiment is not limited thereto and the number of bits of the gray level value of the input image, the number of the first bits, and the number of the second bits may be different from each other.

The processor 140 may identify a plurality of first bits based on the order of each of the plurality of bits. In the above example, if the gray level value of the input image is 11100, the processor 140 may identify 111 as the plurality of first bits, and may identify 00 having a low order as the plurality of second bits.

The processor 140 may control the driver 130 to apply a current of a first magnitude during one or more first time intervals, among a group of first time intervals that is identifiable based on the first bits, and to apply a current of less than or equal to a first magnitude during a second time interval different from the group of first time intervals. The disclosure is not limited thereto, and as such, according to another example embodiment, the second time interval may be a group of second time intervals. In the above example, the processor 140 may control the driver 130 to apply a current of a first magnitude during seven time intervals based on 111, and apply a current of a second magnitude during the eighth time interval. According to an example embodiment, as illustrated in FIGS. 3A to 3E, the group of first time intervals may correspond to the seven intervals T0 to T6, and the second time interval may correspond to the eight time interval T7.

The processor 140 may control the driver 130 to apply a current of less than or equal to a first magnitude during the second time interval (i.e., eight time interval T7) based on a multiplier of the number of at least one second bit for 2. In the above example, assuming that the current of the first magnitude is 4 mA, the processor 140 may control the driver 130 to apply one of 1 mA, 2 mA, 3 mA, 4 mA based on 4, as 2 to the power of 2 is equal to 4, wherein the second bit second bit is 00. The processor 140 may select one of the four currents based on the second bit. In the above example, since the second bit is 00, the processor 140 may control the driver 130 to apply a current of 1 mA during the second time interval.

According to an example embodiment, when the gray level value of the input image is less than a threshold value, the processor 140 may control the driver 130 to apply a current having a second magnitude smaller than the first magnitude during a time interval, among a plurality of time intervals, without applying a current during the remaining time interval among plurality of time intervals, except for the time interval in which the current is applied. According to an example embodiment, if the gray level value of the input image is less than 00100, the processor 140 may not apply a current during the remaining time interval except for one of the plurality of time intervals in which the current is applied. For example, if the gray level value of the input image is 00010, the processor 140 may control the driver 130 to apply a 2 mA current for a time interval without applying a current during the remaining time interval except for one of the plurality of time intervals.

The processor 140 may include a timing controller (TCON) for outputting digital data corresponding to the gray level value of the input image, and the driver 130 may include a driver IC for outputting an analog driving current based on the digital data.

The disclosure is not limited thereto, and the timing controller may be included in the driver 130. The timing controller may be implemented as one hardware with the timing controller of the display panel.

The driver IC may include an interface capable of driving more than a predetermined number of times per frame. For example, the driver IC may include an interface that may drive more than 32 times per frame.

The driver 130 may further include a pixel IC that amplifies the driving current output from the driver IC and outputs the amplified driving current to the backlight unit 120. The pixel IC may output the amplified driving current in a hold state.

The embodiment is not limited thereto, and the driver 130 may be implemented with only a driver IC, and in this case, the driving current output from the driver IC may be provided to the backlight unit 120. Alternatively, the driver IC and the pixel IC may be implemented in one hardware As described above, even though the gray level value of the input image is 5 bits, the processor 140 may efficiently control the backlight unit 120 even if the light emitting device increases, as the data value of 5 bits may be represented with 8 time intervals, instead of 32 time intervals.

In addition, 7 intervals among the 8 time intervals may output a current of a first magnitude or not, and only a time interval may output a current of less than or equal to a first magnitude. Therefore, only a time interval may result in a change in wavelength, and the change in wavelength may be significantly reduced compared to the case of using PAM control.

It is assumed that the gray level value of the input image is 5 bits, the value may be implemented with other bit numbers. It has been described that the 3 bit of the 5 bit gray level value of the input image is the first bit and 2 bit is the second bit, but this may be variously changed depending on the specification required when the electronic apparatus 100 is implemented.

Hereinafter, the operation of the electronic apparatus 100 will be described in more detail with reference to various drawings. Each example embodiment in the following figures may be implemented separately or may be implemented in a combined form.

FIGS. 3A to 3E are diagrams illustrating a driving current according to an example embodiment of the disclosure. In FIGS. 3A to 3E, it is assumed that the gray level value of the input image is 5 bits and the 3 upper bits are the first bit, and 2 lower bits are the second bit. It is assumed that the current of the first magnitude is 4 mA.

Figure 3A:
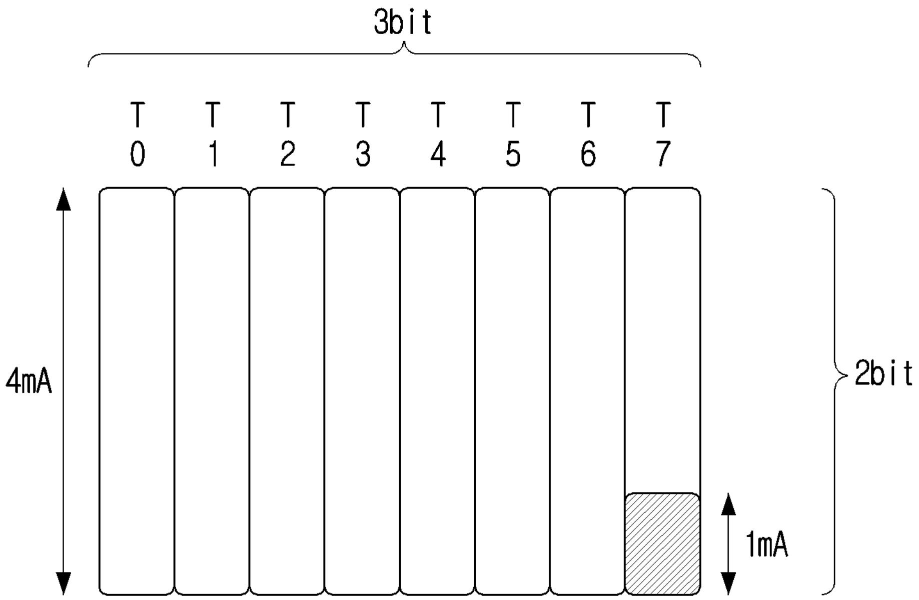
FIGS. 3A to 3E are diagrams illustrating a driving current according to an example embodiment of the disclosure.

FIG. 3A illustrates that the gray level value of the input image is 00000, and the processor 140 may control the driver 130 to output a current of 1 mA during the time interval 7 based on the lower bit 00 without applying a current for time intervals 0 to 6 based on the upper bit 000.

Figure 3B:
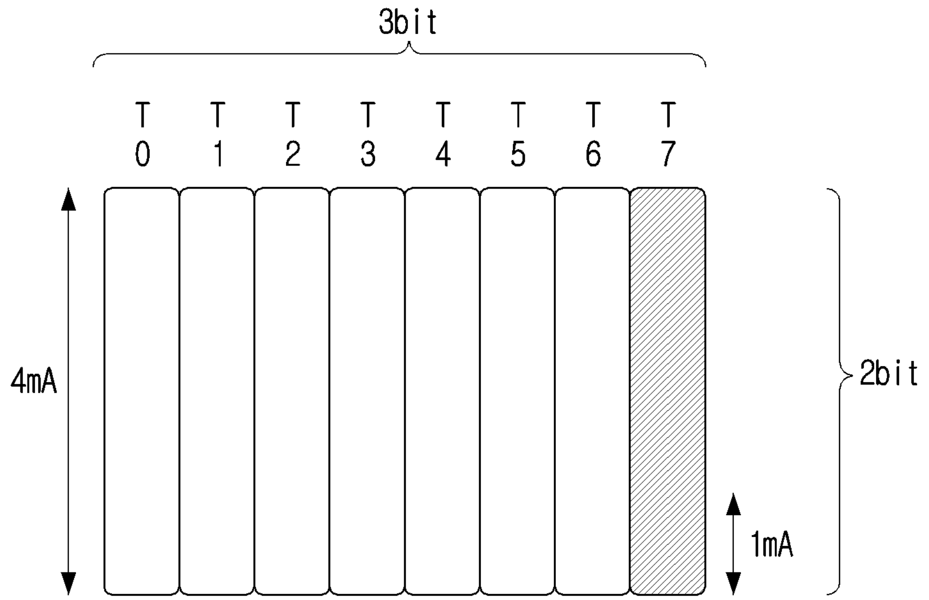

Referring to FIG. 3B, when the gray level value of the input image is 00011, the processor 140 may control the driver 130 to output a current of 4 mA during the time interval 7 based on the lower bit 11 without applying a current for time intervals 0 to 6 based on the upper bit 000.

Figure 3C:
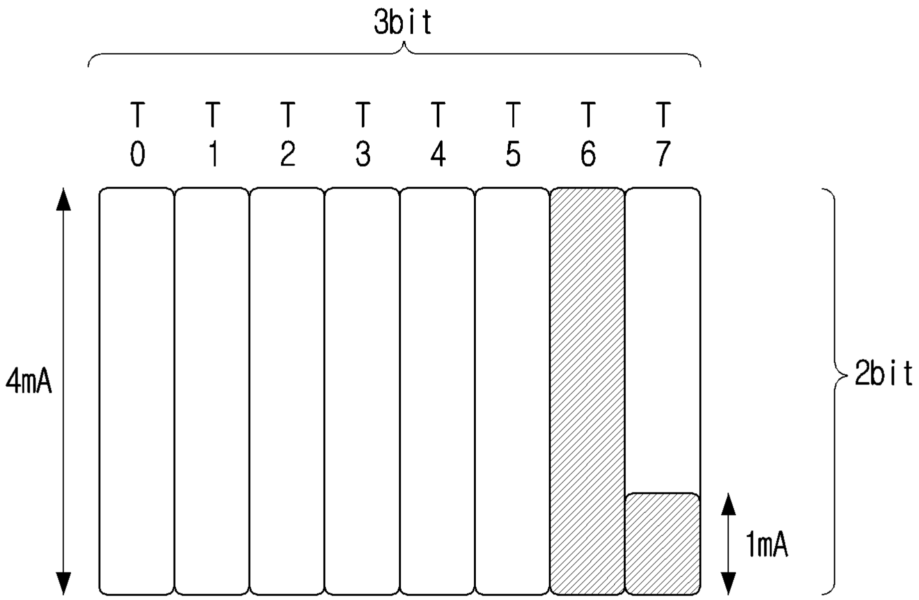

Referring to FIG. 3C, the gray level value of the input image is 00100, and the processor 140 may control the driver 130 to output a current of 4 mA during a time interval 6 without applying a current for time intervals of 0 to 5 based on the upper bit 001, and to output a current of 1 mA for a time interval 7 based on the lower bit 00.

Figure 3D:
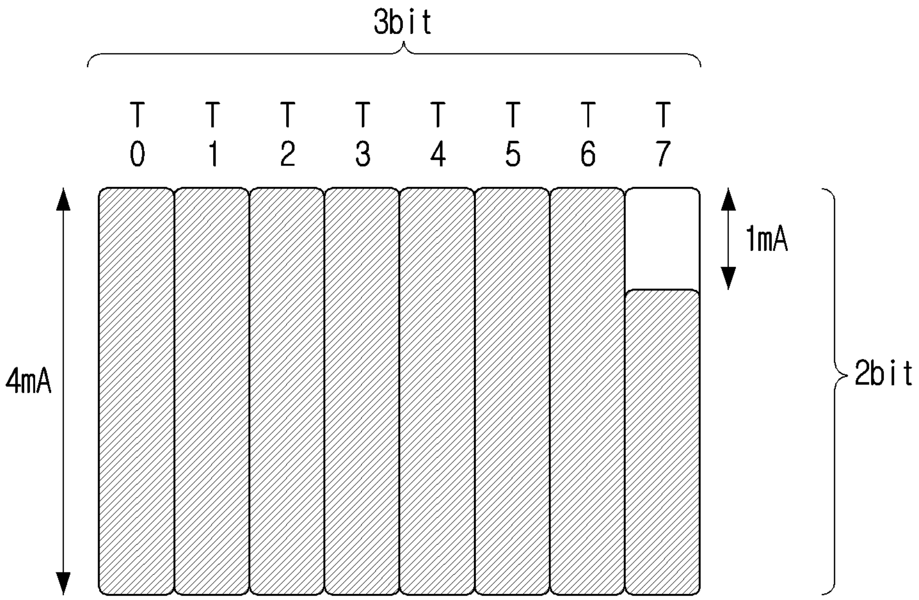

Referring to FIG. 3D, when the gray level value of the input image is 11110, the processor 140 may output a current of 4 mA during the time interval 0-6 based on the upper bit 111, and may control the driver 130 to output a current of 3 mA during the time interval 7 based on the lower bit 10.

Figure 3E:
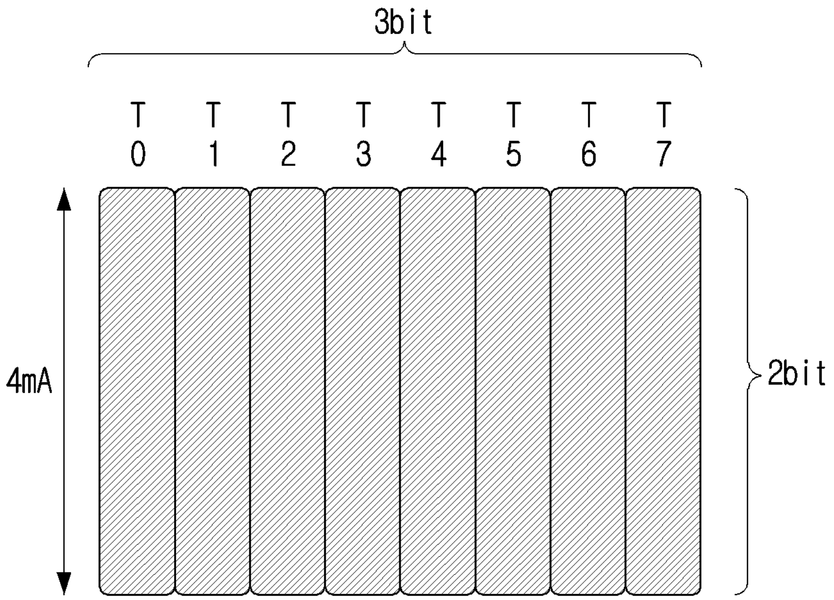

Referring to FIG. 3E, the gray level value of the input image is 11111, and the processor 140 may control the driver 130 to output a current of 4 mA for a time interval of 0 to 6 based on the upper bit 111, and output a current of 4 mA for a time interval of 7 based on the lower bit 11.

Referring to FIGS. 3A to 3E, although the time interval 7 has been described as being controlled by PAM, but the disclosure it is not limited thereto, and the time interval controlled by the PAM is sufficient to be any one of time intervals 0 to 7.

Figure 4A:
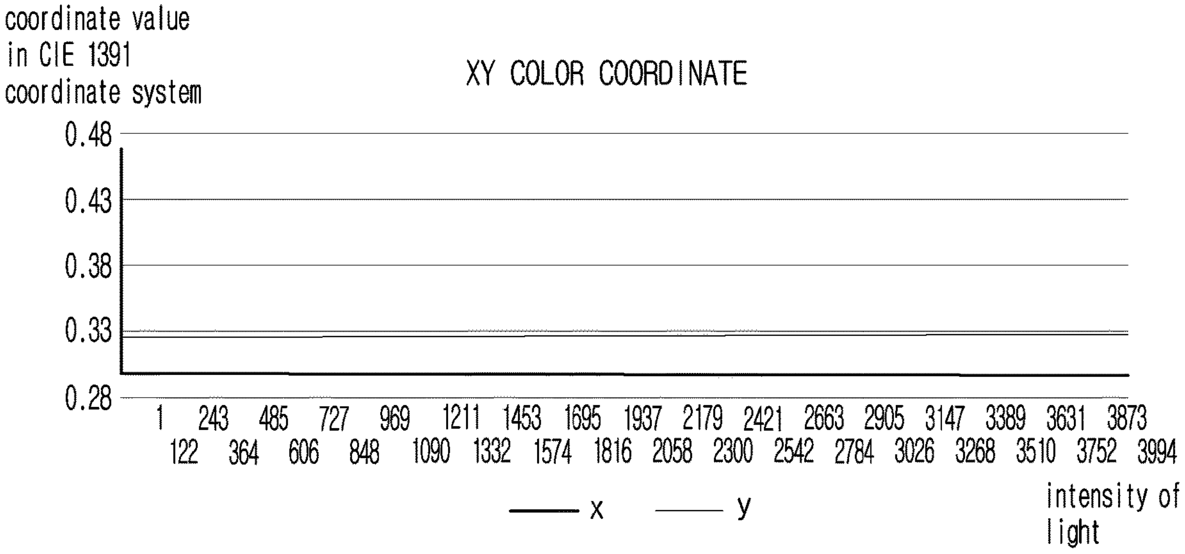
FIGS. 4A and 4B are diagrams illustrating color coordinates according to an example embodiment of the disclosure.
Figure 4B:
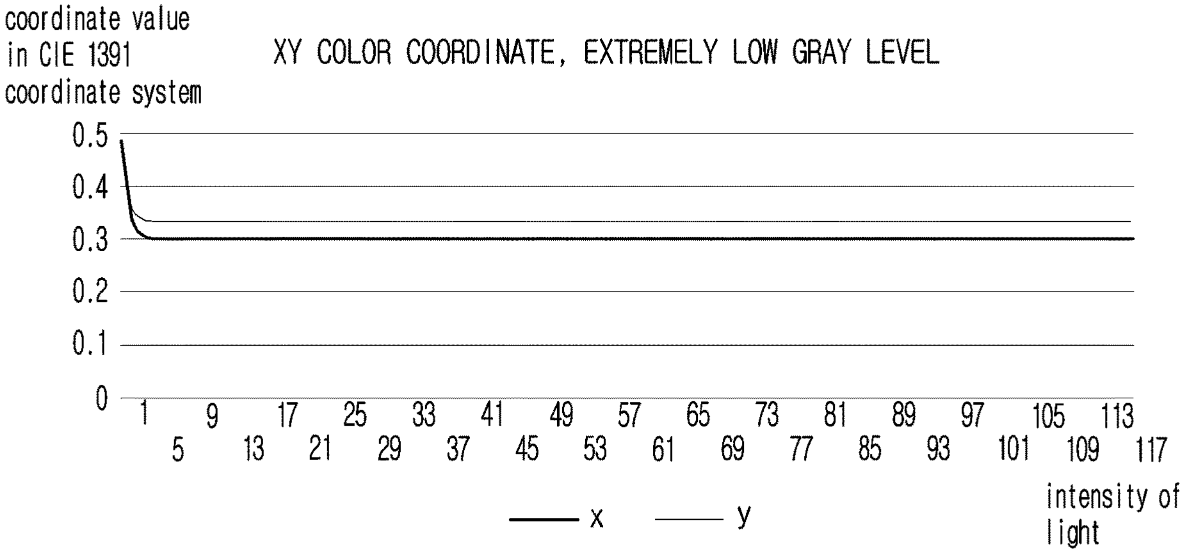

FIGS. 4A and 4B are diagrams illustrating color coordinates according to an example embodiment of the disclosure.

In FIG. 3A to FIG. 3E, when a current is output during a time interval of 0 to 6, only a current of 4 mA may be output, so the same wavelength may be maintained. During the time interval 7, a current having a different magnitude but not 4 mA may be outputted, so that the wavelength may be distorted, but this is only one of a total of 8 time intervals and the problem that the wavelength is distorted may be minimized.

As the number of bits representing the gray level value of the input image increases, the problem that the wavelength is distorted is further reduced. For example, when the gray level value of the input image is represented by 7 bits and the 5 bits are used as the first bit, the number of the entire time intervals is 32, but even in this case, the time interval controlled by the PAM is one, and the problem in which the wavelength is twisted is further reduced.

As shown in FIG. 4A, the color coordinates are not substantially distorted. Moreover, the color coordinates may be slightly different in FIG. 4B, which is a diagram obtained by enlarging a low gray level part of FIG. 4A, but color spots are not generated as the low gray level part is not sensitive to color.

Figure 5A:
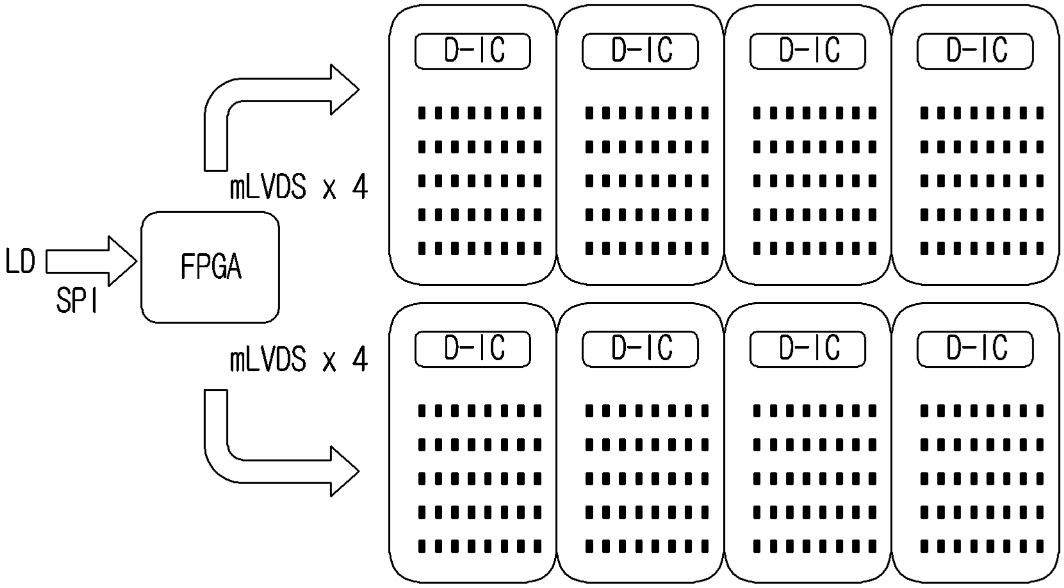
FIGS. 5A and 5B are diagrams illustrating a driver IC and a pixel IC according to an example embodiment of the disclosure.
Figure 5B:
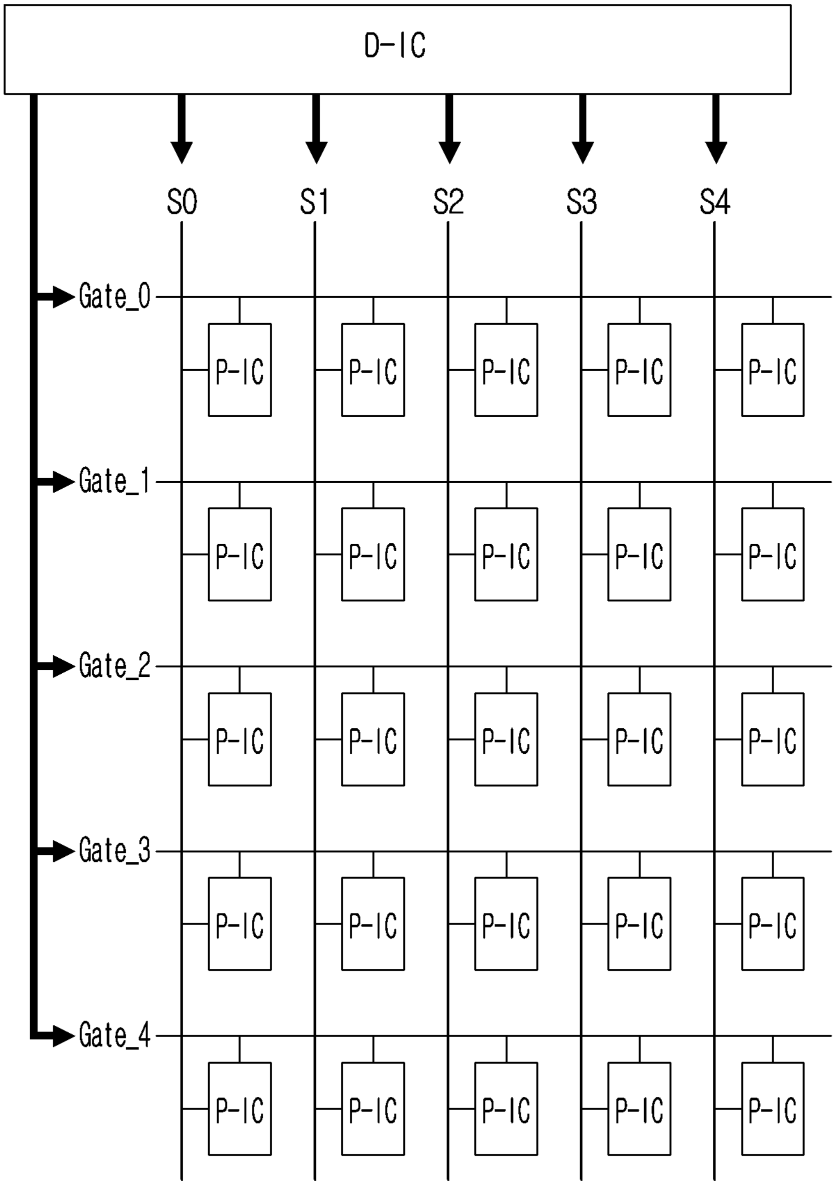

FIGS. 5A and 5B are diagrams illustrating a driver IC and a pixel IC according to an example embodiment of the disclosure.

As shown in FIG. 5A, the timing controller may be implemented as a field programmable gate array (FPGA), and may output digital data corresponding to a gray level value of an input image to each of a plurality of driver ICs.

Each of the plurality of driver ICs may provide a gate control signal and a driving current to the plurality of pixel ICs, as shown in FIG. 5B. Each of the plurality of driver ICs may output an analog driving current corresponding to each of the plurality of pixel ICs based on the digital data.

Each of the plurality of pixel ICs may amplify the driving current output from the corresponding driver IC and output the amplified driving current to the backlight unit. Each of the plurality of pixel ICs may output an amplified driving current in a hold state.

The timing controller, the plurality of driver ICs, and the plurality of pixel ICs shown in FIGS. 5A and 5B are exemplary and may be implemented in other forms.

Figure 6:
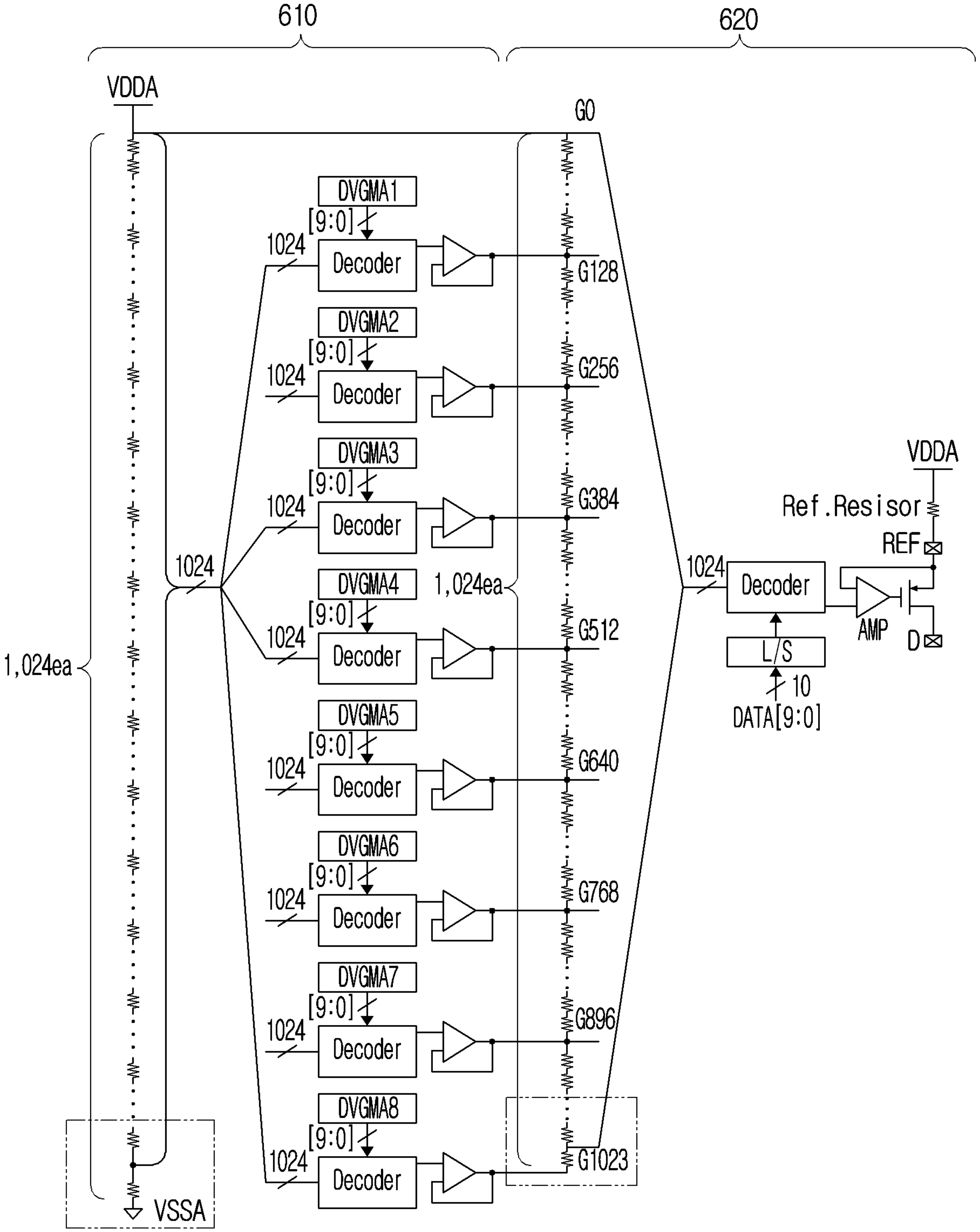
FIG. 6 is a diagram illustrating a driver IC according to an example embodiment of the disclosure.

FIG. 6 is a diagram illustrating a driver IC according to an example embodiment of the disclosure.

In interval 610 of FIG. 6, the maximum (Max) current is determined in association with the analog DVGMA 8 (10 bits) and the linear characteristics of each gray scale may be adjusted through the DVGMA 1-7 (digital gamma). All channels in the driver IC may share interval 610.

In interval 620, 10 bits to be output may be determined, and a linearity compensation algorithm of an LED may be applied.

The circuit configuration shown in FIG. 6 is merely an example embodiment, and the driver IC may be implemented in various forms.

Figure 7:
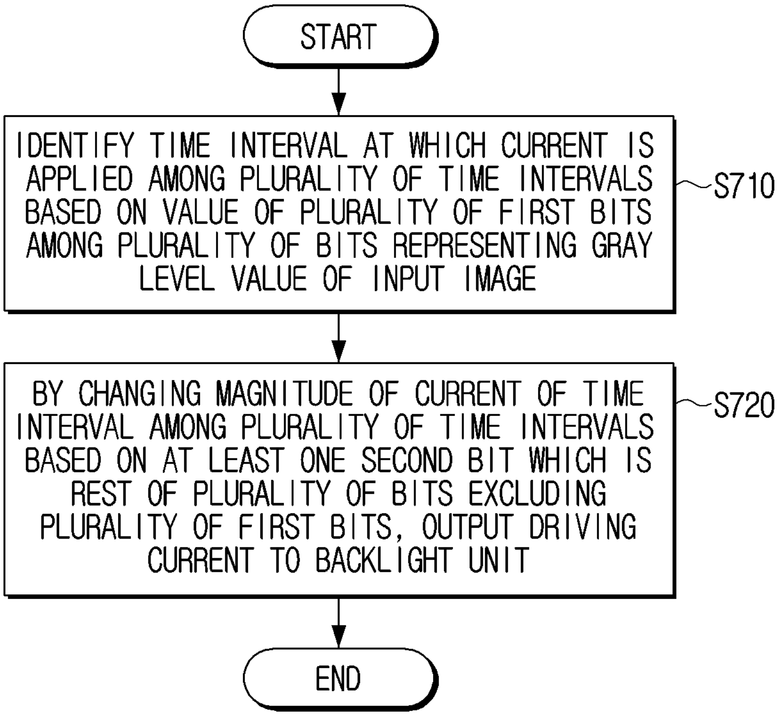
FIG. 7 is a flowchart illustrating a method of controlling an electronic apparatus according to an example embodiment of the disclosure.

FIG. 7 is a flowchart illustrating a method of controlling an electronic apparatus according to an example embodiment of the disclosure.

According to an example embodiment, in operation S710, a time interval at which current is applied, among a plurality of time intervals, is identified based on a value of a plurality of first bits among a plurality of bits representing a gray level value of the input image. In operation S710, a driving current is output to a backlight unit by changing a magnitude of a current of a time interval among the plurality of time intervals based on at least one second bit which is the rest of the plurality of bits excluding the plurality of first bits. A number of the plurality of time intervals may be determined based on the number of the plurality of first bits.

The method may further include identifying the plurality of first bits based on an order of each of the plurality of bits.

According to an example embodiment, in operation S720, the outputting of the driving current may include applying a current of a first magnitude during one or more first time intervals, among a group of first time intervals that is identifiable based on the first bits, and applying a current below or equal to the first magnitude during the second time interval different from the group of first time intervals.

The outputting in operation S720 may include applying a current of the first magnitude or below based on a multiplier of a number of the at least one second bit for 2. That is, the number of the plurality of time intervals may be calculated by raising 2 to the power of a number plurality of first bits.

The outputting in operation S720 may include, based on a gray level value of the input image being less than a threshold value, not applying a current for a remaining time interval except the time interval, among the plurality of time intervals, in which the current is to be applied, and applying a current of a second magnitude less than the first magnitude for the time interval.

In operation S710, digital data corresponding to the gray level value of the input image may be output by the timing controller TCON, and the driving current is output in operation S720 may output, by the driver IC, a driving current of an analog type based on the digital data.

The operation S720 of outputting the driving current may amplify the driving current output from the driver IC by the pixel IC, and output the amplified driving current to the backlight unit.

The outputting the driving current in operation S720 may output the amplified driving current in a hold state.

The number of a plurality of time intervals may be the multiplier of the number of the plurality of first bits for 2. That is, the number of the plurality of time intervals may be calculated by raising 2 to the power of a number plurality of first bits.

According to various example embodiments of the disclosure as described above, the electronic apparatus controls the backlight unit to be PWM-controlled using only a part of the bits representing the gray level value of the input image, so that color uniformity may be ensured even if the number of bits of the gray level value increases or the light emitting element to be controlled is increased.

The electronic apparatus may control the backlight unit by PAM by using the rest of the bits representing the gray level value of the input image, thereby increasing the expression of the gray level value.

The various example embodiments described above may be implemented as software including instructions stored in a machine-readable storage media which is readable by a machine (e.g., a computer). The device may include the electronic apparatus according to the example embodiments of the disclosure, as a device which calls the stored instructions from the storage media and which is operable according to the called instructions. When the instructions are executed by a processor, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

According to an example embodiment, a method according to one or more embodiments may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product (e.g., downloadable app) may be at least stored temporarily in a storage medium such as a server of a manufacturer, a server of an application store, or a memory of a relay server, or temporarily generated.

The various example embodiments described above may be implemented in a recordable medium which is readable by a computer or a device similar to the computer using software, hardware, or the combination of software and hardware. In some cases, example embodiments described herein may be implemented by the processor itself. According to a software implementation, example embodiments such as the procedures and functions described herein may be implemented with separate software modules. Each of the software modules may perform one or more of the functions and operations described herein.

According to various example embodiments described above, computer instructions for performing processing operations of a device according to the various example embodiments described above may be stored in a non-transitory computer-readable medium. The computer instructions stored in the non-transitory computer-readable medium may cause a particular device to perform processing operations on the device according to the various example embodiments described above when executed by the processor of the particular device. The non-transitory computer-readable medium does not refer to a medium that stores data for a short period of time, such as a register, cache, memory, etc., but semi-permanently stores data and is available of reading by the device. For example, the non-transitory computer-readable medium may be CD, DVD, a hard disc, Blu-ray disc, USB, a memory card, ROM, or the like.

Each of the elements (e.g., a module or a program) according to various example embodiments may be comprised of a single entity or a plurality of entities, and some sub-elements of the abovementioned sub-elements may be omitted, or different sub-elements may be further included in the various example embodiments. Alternatively or additionally, some elements (e.g., modules or programs) may be integrated into one entity to perform the same or similar functions performed by each respective element prior to integration. Operations performed by a module, a program, or another element, in accordance with various example embodiments, may be performed sequentially, in a parallel, repetitively, or in a heuristically manner, or at least some operations may be performed in a different order, omitted or a different operation may be added.

While example embodiments of the disclosure have been illustrated and described, the disclosure is not limited to the specific embodiments described above. It will be understood by those skilled in the art that various changes in form and details may be made therein without departing from the true spirit and full scope of the disclosure, including the appended claims and their equivalents.

What is claimed is:

1. An electronic apparatus comprising:

a memory storing an image;

a backlight unit;

a driver configured to output a driving current to the backlight unit; and a processor configured to control the driver to output a first current of a first magnitude during a first time interval among a plurality of time intervals and output a second current having a second magnitude equal to or below the first magnitude during a second time interval, which is one of the plurality of time intervals, based on a gray level value of the image, wherein the first time interval is determined based on a value of a part of a plurality of bits corresponding to the gray level value of the image, and wherein a number of the plurality of time intervals is equal to 2 to the power of n, where n is a number of the part of the plurality of bits.

2. The electronic apparatus of claim 1, wherein the processor is further configured to identify the first time interval based on a value of a plurality of first bits, among the plurality of bits corresponding to the gray level value of the image, and control the driver to change a magnitude of the second current based on at least one second bit, among the plurality of bits, different from the plurality of first bits, wherein a number of the plurality of time intervals is based on a number of the plurality of first bits.

3. The electronic apparatus of claim 2, wherein the processor is further configured to identify the plurality of first bits based on an order of each of the plurality of bits.

4. The electronic apparatus of claim 2, wherein the second magnitude of the second current is determined by raising two to the power of a number of the at least one second bit.

5. The electronic apparatus of claim 2, wherein the processor is further configured to control the driver to, based on the gray level value of the image being less than a threshold value, refrain from applying a current for remaining time intervals except the second time interval, among the plurality of time intervals, and to apply the second current of the second magnitude less than the first magnitude for the second time interval.

6. The electronic apparatus of claim 2, wherein the processor comprises:

a timing controller configured to output digital data corresponding to a gray level value of the image, and wherein the driver comprises a driver integrated circuit (IC) configured to output the driving current in an analog format based on the digital data.

7. The electronic apparatus of claim 6, wherein the driver further comprises:

a pixel IC configured to amplify the driving current output from the driver IC and output the amplified driving current to the backlight unit.

8. The electronic apparatus of claim 7, wherein the pixel IC outputs the amplified driving current in a hold state.

9. The electronic apparatus of claim 6, wherein the driver IC comprises an interface drivable for a predetermined number or more per frame.

10. The electronic apparatus of claim 2, wherein the number of the plurality of time intervals is determined by raising two to the power of a number of the plurality of first bits.

11. A control method of an electronic apparatus, the method comprising:

outputting a first current of a first magnitude during a first time interval among a plurality of time intervals based on a gray level value of an image; and outputting a second current having a second magnitude equal to or below the first magnitude during a second time interval, which is one of the plurality of time intervals based on the gray level value of the image, wherein the first time interval is determined based on a value of a part of a plurality of bits corresponding to the gray level value of the image, and wherein a number of the plurality of time intervals is equal to 2 to the power of n, where n is a number of the part of the plurality of bits.

12. The method of claim 11, further comprising:

identifying the first time interval based on a value of a plurality of first bits, among the plurality of bits corresponding to the gray level value of the image; and changing a magnitude of the second current based on at least one second bit, among the plurality of bits, different from the plurality of first bits, wherein a number of the plurality of time intervals is determined based on the number of the plurality of first bits.

13. The method of claim 12, further comprising:

identifying the plurality of first bits based on an order of each of the plurality of bits.

14. The method of claim 12, wherein the second magnitude of the second current is determined by raising two to the power of a number of the at least one second bit.

15. The method of claim 12, wherein the outputting the first current comprises, based on the gray level value of the image being less than a threshold value, refraining from applying a current for remaining time intervals except the second time interval, among the plurality of time intervals, and the outputting the second current comprises, based on the gray level value of the image being less than the threshold value, applying the second current of the second magnitude less than the first magnitude for the second time interval.

16. The method of claim 12, wherein the identifying comprises outputting, by a timing controller, digital data corresponding to the gray level value of the image, and wherein the outputting the first current and the second current comprises outputting, by a driver integrated circuit (IC), a driving current in an analog format based on the digital data.

17. The method of claim 16, wherein the outputting the first current and the second current comprises amplifying, by a pixel IC, the driving current output from the driver IC and outputting the amplified driving current to a backlight unit.

18. The method of claim 17, wherein the outputting the first current and the second current comprises outputting, by the pixel IC, the amplified driving current in a hold state.

19. The electronic apparatus of claim 1, wherein the second magnitude is less than the first magnitude.

* * * * *